US007628294B2

(12) United States Patent
Boermann

(10) Patent No.: US 7,628,294 B2
(45) Date of Patent: Dec. 8, 2009

(54) PUMP, DISPENSER AND CORRESPONDING PROCESS FOR DISPENSING A LIQUID OR VISCOUS MASS

(75) Inventor: Frank T. Boermann, Krefeld (DE)

(73) Assignee: Falter Service GmbH & Co. KG, Krefeld (DE)

( * ) Notice: Subject to any disclaimer, the term of this patent is extended or adjusted under 35 U.S.C. 154(b) by 568 days.

(21) Appl. No.: 11/568,934

(22) PCT Filed: Apr. 6, 2005

(86) PCT No.: PCT/EP2005/003592

§ 371 (c)(1),
(2), (4) Date: Nov. 10, 2006

(87) PCT Pub. No.: WO2005/110620

PCT Pub. Date: Nov. 24, 2005

(65) Prior Publication Data

US 2007/0172369 A1 Jul. 26, 2007

(30) Foreign Application Priority Data

May 14, 2004 (DE) ....................... 10 2004 024 471

(51) Int. Cl.
*F04B 39/10* (2006.01)
*G01F 11/02* (2006.01)

(52) U.S. Cl. ................. 222/309; 222/321.5; 222/321.9; 417/547

(58) Field of Classification Search ................. 222/309, 222/321.4, 321.5, 321.7, 321.9, 340; 417/490, 417/547, 552
See application file for complete search history.

(56) References Cited

U.S. PATENT DOCUMENTS

| | | | | |
|---|---|---|---|---|
| 1,611,601 | A * | 12/1926 | McCall | 222/321.5 |
| 1,708,834 | A * | 4/1929 | Eldred | 222/321.5 |
| 3,239,109 | A * | 3/1966 | Santarelli | 222/321.5 |
| 3,749,289 | A * | 7/1973 | Levy | 222/321.9 |
| 4,842,495 | A | 6/1989 | Howlett | |
| 5,234,134 | A * | 8/1993 | Raab et al. | 222/321.7 |
| 5,975,360 | A | 11/1999 | Ophardt | |
| 6,196,424 | B1 * | 3/2001 | Bougamont et al. | 222/321.9 |
| 2006/0065675 | A1 * | 3/2006 | Bougamont et al. | 222/321.9 |

FOREIGN PATENT DOCUMENTS

| | | |
|---|---|---|
| DE | 39 28 521 | 3/1991 |
| EP | 0774074 | 5/1997 |
| EP | 0854685 | 7/1998 |
| JP | 10-324358 | 12/1998 |

* cited by examiner

*Primary Examiner*—Kenneth Bomberg
(74) *Attorney, Agent, or Firm*—Rankin, Hill & Clark LLP

(57) ABSTRACT

To improve sealing efficiency in a pump withdrawing liquid from a supply container (1) and to minimize the liquid residue in said container, the pump is designed to include a cylinder (5), a hollow plunger (6) configured within said cylinder, an external accessory pipe (7) configured at least partly within said plunger, and a feed pipe (8) configured at least partly within said external, accessory pipe, the internal feed pipe (8) being displaceable relative to the external accessory pipe (7) which in turn is displaceable relative to the hollow plunger (6).

Figure 1:
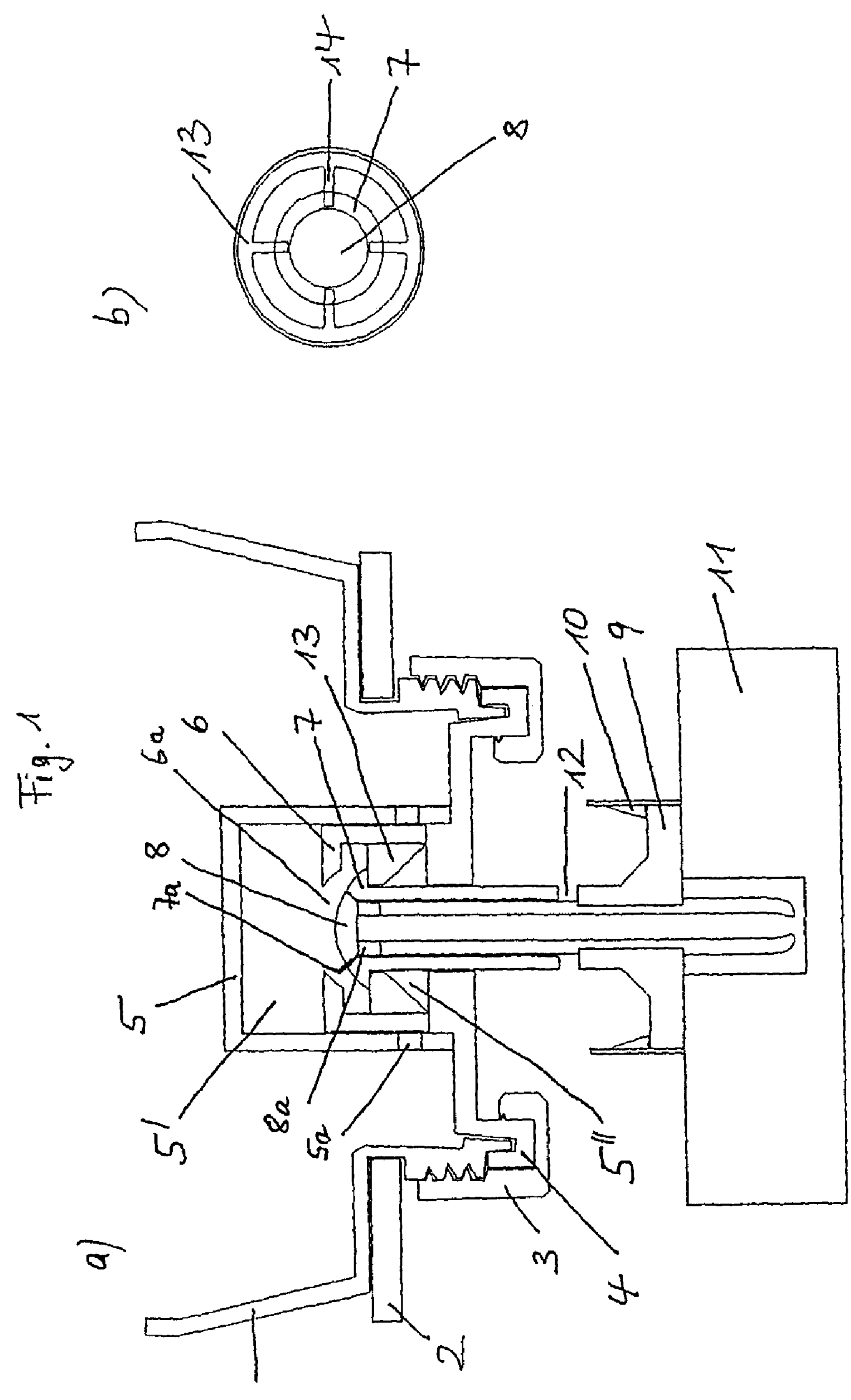
Figure 2:
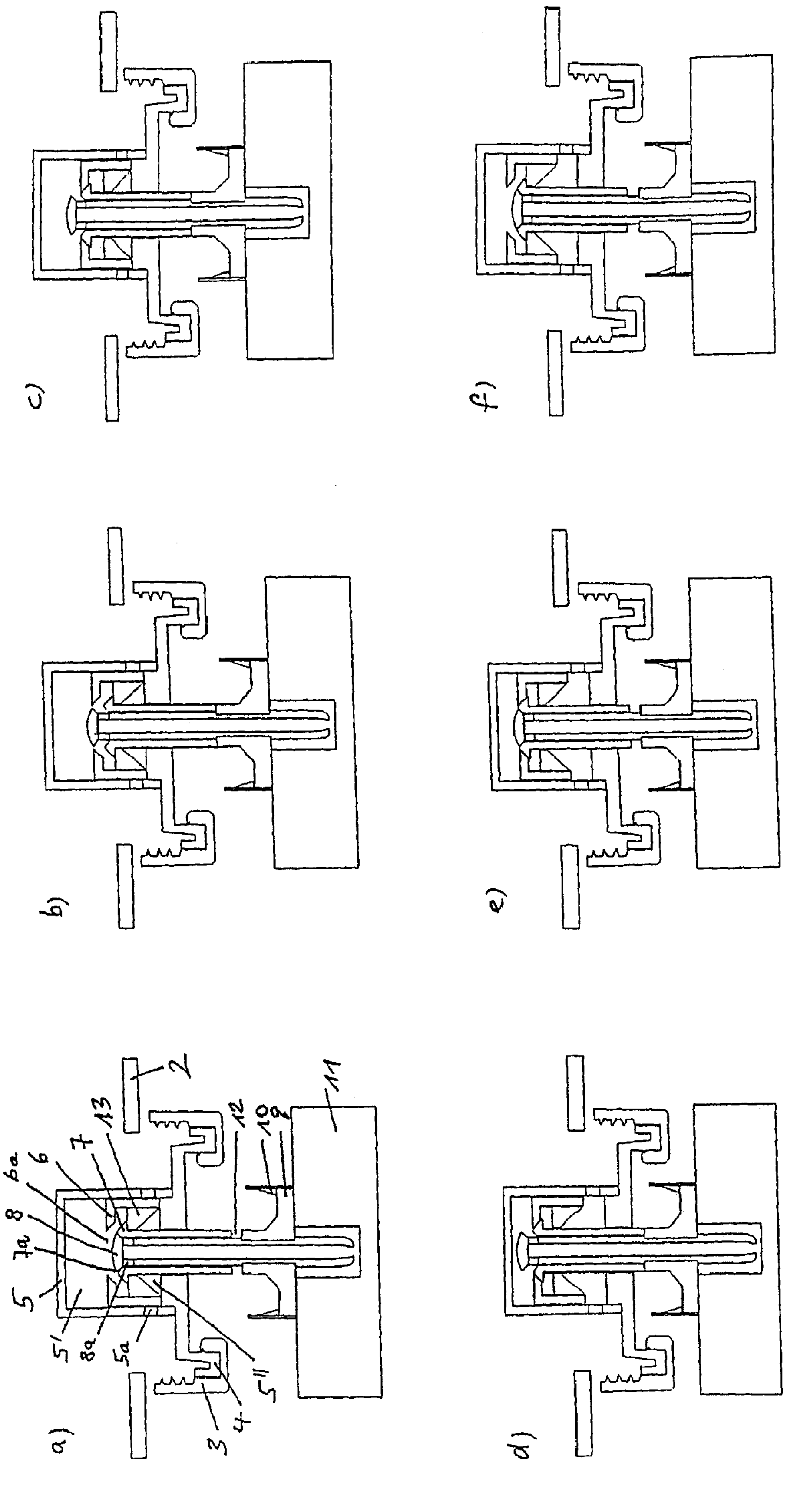

22 Claims, 4 Drawing Sheets a)
b)
1
2
3
4
5
5'
5''
5a
6
6a
7
7a
8
8a
9
10
11
12
13
14

PUMP, DISPENSER AND CORRESPONDING PROCESS FOR DISPENSING A LIQUID OR VISCOUS MASS

The present invention relates to a pump removing a liquid or a viscous mass, hereafter pasty substance, in particular liquid soap, creams, disinfectants, foodstuffs or other fluid substances from a supply container, in particular a contractible supply container, further to a corresponding dispenser, and to a corresponding method to withdraw a liquid or a pasty substance.

Such pumps and dispensers are known in many designs. Illustratively liquid-soap withdrawing pumps are known that comprise a chamber-subtending body, hereafter always termed "cylinder", two one-way valves, also called check valves, and a piston guided within said cylinder. Conventionally such pumps contain at least several metallic parts such as metal balls for one-way valves and metal springs to prestress said one-way valves when in the closed position. Using metal parts entails the drawback that, when ground for material recovery, said pumps cannot be processed in simple manner in plastic mills most of which are incompatible with metal parts. Prior separation of plastic from metal parts would entail significant costs.

As a result pumps have been developed which are composed exclusively of plastic parts. Illustratively U.S. Pat. No. 5,975,360 discloses as shown in its FIGS. 4 and 5 a liquid-soap removing pump fitted with a cylinder communicating through a plastic clack valve in manner that said liquid is able to flow from the supply container into the cylinder but back-flow shall be essentially precluded. A longitudinally reciprocating plunger is configured within said cylinder and consists of a feed pipe that is sealed upward, namely in the direction of the check valve, and which comprises two mutually apart seals at its upper end, each seal diameter corresponding to the cylinder's inside diameter. Apertures are fitted into the feed pipe transversely to its longitudinal direction and communicate with the central duct of the feed pipe. The seal configured above the said apertures is an elastic lip, whereas the lower seal is a rigid plastic annulus. When the plunger is moved downward from its upper end position, a partial vacuum will be generated in the cylinder portion above the plunger, as a result of which the check valve is made to open and liquid soap will be pumped out of the supply container into the upper cylinder portion. If thereupon the plunger is moved from its lower end position back into its upper one, excess pressure shall be generated in the cylinder portion above the plunger and thereby the check valve shall be closed again. In the ideal case the soap situated in the upper cylinder portion cannot return into the supply container and, if there is enough pressure buildup at the elastic seal, will penetrate the gap between the two seals and from there it will pass through said apertures into the feed pipe which lastly releases the soap into the ambience.

However the known pump incurs the drawback that in time the check valve's sealing action will degrade, for instance on account of dried soap residues accumulating around the clack valve. Moreover, when a check valve is totally made of plastic, it will be relatively elastic, further degrading the sealing effectiveness. As soon as sealing effectiveness is slightly impaired, and the flow of liquid separates, ambient air shall flow into the supply container. As a result only insufficient vacuum is feasible in the supply container, which as a rule is contractible, However a good vacuum is mandatory for optimal check valve operation. Also, the supply container cannot be optimally compressed, and as a result the liquid soap cannot be entirely sucked out of it. Because of the impossibility of optimally compressing the supply container of the known pump, said container as a rule retains a residual waste of 5 to 20% of the initial content.

Advances in the above described pump are also known, which eliminate entirely the said check valve. Illustratively U.S. Pat. No. 5,975,350 in its FIGS. 11 through 21 discloses a pump of which the cylinder is partitioned into an upper and a lower chamber, these two chambers being cross-sectionally different. In this case too the plunger consists of an feed pipe with peripheral seals of which there are three in this design. The two lower seals correspond to those of the above described state of the art, again apertures being present in the feed pipe between said seals in order set up communication between the inter-seal space and the duct of the feed pipe. Both lower seals, namely the rigid one and the elastic one, rest in sealing manner in the lower chamber against the plunger. A further seal also in the form of an elastically sealing lip is configured above said two seals in the region of the upper chamber. A partial vacuum is produced during the plunger's reciprocation between the two upper, elastic sealing lips and due to the different volumes of the plunger chambers, said partial vacuum causes soap to move out of the supply container and past the upper sealing lip to be forced into the space between the two elastic sealing lips. When thereupon the plunger is displaced in the opposite direction, excess pressure is produced by the two differentially large chambers between the two elastic lips, and, because, on account of its shape, the sealing lip prevents the soap from flowing back in the direction of the vacuum, the soap being forced past the lower sealing lip into the region between the two lower sealing lips. The soap then passes from there through the aperture and the feed pipe into the ambience.

The just above described pump is free of a check valve but on the other hand it includes several elastic seals. These seals again incur the drawback that their effectiveness degrades with time, in particular when, in the vicinity of the seals, the product to be pumped has superficially dried, whereby wastes remain in the supply container. The larger-grained, i.e. the coarser the product to be pumped, or its admixtures, the larger such wastes.

Based on the above described state of the art, it is the objective of the present invention to create a pump withdrawing a liquid or a pasty substance, in particular liquid soap, and a corresponding dispenser and a corresponding method, to attain improved sealing and allowing reducing the residual waste in the supply container.

The above-stated objective is attained by means of a pump withdrawing a liquid or a pasty substance, in particular liquid soap, from a supply container, in particular a contractible supply container, comprising a cylinder, a hollow plunger configured within the cylinder, an external accessory pipe configured at least partly within the hollow plunger and an inner feed pipe configured at least partly within the external accessory pipe, the internal feed pipe being displaceable relative to the external accessory pipe and cooperating in such manner with the external accessory pipe that displacement of the internal feed pipe constrains displacement of the external accessory pipe, this external accessory pipe being displaceable relative to the hollow plunger and cooperating in such manner with this hollow plunger that displacement of the external pipe constrains displacement of the hollow plunger, the hollow plunger being displaceable relative to the cylinder, at least one aperture being fitted into the cylinder to set up communication between the space inside the supply container and the space inside the cylinder, said aperture to be opened and closed by the hollow plunger, an aperture being fitted into the hollow plunger and to be opened and closed by the feed pipe acting jointly with the external accessory pipe, an aperture being fitted in the external accessory pipe and to be opened and closed by the internal feed pipe, at least one aperture being fitted in the internal feed pipe and to be opened and closed by the external accessory pipe in a manner that liquid or a pasty substance can be simultaneously fed through the feed pipe into the ambience and be aspirated from the supply container into the cylinder.

All information relating to displacements and positions, such as "top", "bottom" etc. refer to the pump's longitudinal direction, namely the direction in which the liquid or pasty medium—hereafter denoted as "liquid" for the sake of simplicity—moves from the cylinder through the feed pipe into the ambience, that is the region outside the dispenser.

In the first place, the pump of the present invention is operative without any check valve and any elastic sealing lips, that is, said pump foregoes those parts which in the state of the art negatively affect both sealing and vacuum buildup in the supply container. The pump of the present invention furthermore differs from that of the state of the art in that there is simultaneous feed of liquid from the cylinder into the ambience and aspiration of new liquid from the supply container into the cylinder, whereby, in the present invention, self-suction takes place. The present invention allows optimally evacuating liquid from the feed container and reducing the residual liquid in said container.

Advantageously the cylinder comprises a circumferential side wall, an upper front wall and a base.

Advantageously the hollow plunger configured within the cylinder is fitted with a circumferential side wall, an upper front wall and a base.

Advantageously the external accessory pipe configured at least in part within the hollow plunger is fitted with a circumferential pipe wall, an upper open end and a lower, open end.

Advantageously the internal feed pipe configured at least in part within the external accessory pipe is fitted with a circumferential pipe wall, an upper, closed end and a lower, open end, at least one aperture being configured in the upper portion of the pipe wall transversely to the longitudinal direction.

In one preferred embodiment mode of the present invention, the cylinder is partitioned into an upper and a lower chamber, the upper chamber being defined as the space between the upper cylinder front wall and the upper hollow-plunger front wall and the lower chamber being defined as the space between the upper hollow-plunger front wall and the cylinder base, the cylinder being fitted with an aperture in the base which is crossed by the external accessory pipe from the ambience into the cylinder inside having one or more apertures in a region which can be covered at its inside by the hollow plunger.

In a further design of the present invention, the hollow plunger rests in displaceable manner in the cylinder and the hollow-plunger sidewall is connected in sliding and sealing manner to the cylinder side wall, the hollow plunger being displaceable between a lower end position wherein the cylinder's apertures are covered in sealing manner in the region internally covered by the hollow plunger, and an upper end position wherein the cylinder's apertures are clear in the zone that may be internally covered by the hollow plunger, the hollow plunger being fitted with at least one aperture in its base and with one aperture in the upper front wall.

In still another preferred embodiment of the present invention, the external accessory pipe rests displaceably in the cylinder base aperture and the wall of the external accessory pipe is connected in sliding, sealing manner to the cylinder's base aperture, the external accessory pipe being displaceable between a lower end position wherein the upper end of the external is configured a distance away from the upper front wall of the hollow plunger and an upper end position wherein the external accessory pipe's upper end is sealed off by the upper front wall of the hollow plunger, an intermediate position between the lower end position and the upper end position being defined as that position wherein the external accessory pipe's is sealed off by the hollow plunger's upper front wall when the hollow plunger is situated in the lower end position and being away from the hollow plunger's upper front wall when the hollow plunger is situated in its upper end position, the external accessory pipe being fitted with a protrusion cooperating with a portion of the hollow plunger.

In a further preferred design of the present invention, the internal feed pipe rests displaceably in the external accessory pipe and the pipe wall is connected in sealing, sliding manner with the wall of the external accessory pipe, the internal feed pipe being displaceable relative to the external accessory pipe between a closed position wherein the pipe wall aperture of the internal feed pipe is covered in sealing manner by the upper end of the wall of the external accessory pipe and an open position wherein the aperture in the internal feed pipe's wall is clear, the diameter of the feed pipe's upper end being less than the diameter of the aperture in the upper front wall of the hollow plunger and the internal feed pipe being fitted with a protrusion cooperating with a portion of the external accessory pipe.

Another preferred embodiment mode of the present invention comprises a receiving disk to be connected to the displaceable part of a dispenser and to the internal feed pipe and configured at such a distance underneath the external accessory pipe's lower end that a spacing is subtended between the upper end of the receiving disk and the lower end of the external accessory pipe when the internal feed pipe is in its closed configuration and the upper end of the receiving disk and the lower end of the external accessory pipe touch each other when the internal feed pipe is in its open position.

In one advantageous embodiment mode of the pump of the present invention, the cylinder base is a component of an insert with which to seal the supply container relative to the ambience. Moreover the cylinder's apertures in the zone that may be covered internally by the hollow plunger are configured in the cylinder's side wall. Preferably said apertures are configured near the base.

In a further advantageous embodiment mode of the present invention, the hollow plunger when in its lower end position will touch the cylinder base. As a result and in conjunction with the external pipe protrusion cooperating with part of the hollow plunger, the lower end position of the external accessory pipe shall have been defined because the hollow plunger comes to a stop against the cylinder base. Moreover the diameter of the aperture in the hollow plunger base may be selected to be equal to the inside diameter of said plunger. In this manner the base is constituted solely by the lower edge of the hollow plunger side wall, resulting in savings in material.

In still a further advantageous embodiment mode of the present invention, the external pipe protrusion may be at least an arcuate or a circumferential flange or a collar. The same design also may apply to the internal feed pipe. Again the protrusion may be a circumferential flange or collar. The hollow plunger part cooperating with the protrusion may be a stop element joined in particular to the hollow plunger side wall. However the hollow plunger part cooperating with the protrusion also may be the hollow plunger's upper front wall or its base. It is mandatory that the external accessory pipe protrusion shall drive the hollow plunger both upward and downward. Similarly it is mandatory that the internal feed pipe protrusion cooperate with the external accessory pipe in a manner that a downward displacement of the internal feed pipe shall constrain a downward displacement of the external accessory pipe.

Advantageously said stop, which constitutes the hollow plunger part that cooperates with the external accessory pipe protrusion, is fitted with one or more strips or brackets or also a perforated annulus, said perforations connecting the zone above the stop to the zone below the stop. In this manner, and at any time, in particular when following a downward displacement, the protrusion rests on the stop, communication and hence exchange of liquid between the lower and upper chambers being assured.

In still a further embodiment mode of the pump of the present invention, the receiving disk is fitted with a device allowing changing the distance between the upper receiving disk end and the lower external accessory pipe end when the internal feed pipe is in its closed position, that is, in the case the distance between the receiving disk and the accessory pipe being a maximum. This feature offers the advantage that the internal excursion and hence quantity dispensed is adjustable, also being independent of the external excursion of the dispenser's displaceable part, said excursion always remaining constant. The smaller the adjusted maximum distance between the upper receiving disk and the lower external accessory pipe end, the farther the external accessory pipe shall force the hollow plunger upward and the more liquid shall be expelled from the upper cylinder chamber through the feed pipe.

The distance-adjusting device may be in the form of an upper receiving disk part and be connected in such manner to a lower receiving disk part or to the internal feed pipe that the distance between the lower receiving disk part and the upper receiving disk part shall be adjustable. Therefore, if the lower receiving disk part is stationary and its upper part is displaced toward the lower external accessory pipe end, then the distance between the upper receiving disk end and the lower external accessory pipe shall also be decreased.

Said adjustment device may be operated in especially simple manner by connecting the upper receiving disk part by a thread with the lower part of said disk or with the internal feed pipe in order that rotating the upper part relative to the lower part of the receiving disk or rotating the receiving disk's upper part relative to the internal feed pipe shall entail a change in the distance between the receiving disk's lower and upper parts.

Still another advantageous embodiment mode of the pump of the present invention comprises at least one restoring spring acting directly or indirectly on the internal feed pipe. Conceivably too several restoring springs may act directly or indirectly on the internal feed pipe. Heretofore the state of the art has mandatorily required a dispenser with its own restoring spring to terminate a pumping procedure and to return the pump into its rest position. If now at least one restoring spring is integrated into the pump or forms one unit jointly with this pump, then the apertures in the cylinder side wall will be automatically closed after a pumping procedure, or will stay automatically closed when the pump is at rest, without having to use a dispenser, namely the restoring spring integrated into the pump acts on the internal feed pipe and constrains covering the apertures by means of the hollow plunger's side wall, said plunger being operationally connected by the external accessory pipe to the internal feed pipe.

Such a design unit is especially well suited to seal a supply container for a liquid or a pasty substance. If a pump fitted with a restoring spring is configured in or on the aperture of a supply container, for instance being screwed or welded to said container, then this container also may be used or supported independently of a dispenser.

If the pump and/or the supply container are fitted with an affixation element such as a retaining groove, a dispenser of complex design may be replaced by a comparatively simple and commensurately economical wall anchor or the like to store said supply container. Such a unit of pump and supply container is especially well suited as foodstuff packaging, for instance for mayonnaise, ketchup, mustard or the like.

The operation of the pump in conjunction with a corresponding supply container and a corresponding dispenser is as follows:

In the rest position, the apertures connecting the cylinder inside space to the supply container are internally covered in sealing manner by the hollow plunger, as a result of which exchange of liquid is precluded between the supply container and the cylinder. At the same time the internal feed pipe is in its closed position, as a result of which the passage from the cylinder inside space through the feed pipe into the ambience is closed.

As soon as the user operates the displaceable dispense element, the receiving disk and hence the feed pipe shifts upward until the receiving disk's upper end comes to rest against the lower end of the external accessory pipe. As a result the internal feed pipe has moved into its open position and the passage between the cylinder and the ambience has been opened.

As the displaceable dispenser element is moved farther upward, the external accessory pipe also is displaced thereby upward from its lower end position because the receiving disk transmits the motion of the displaceable dispenser to the external accessory pipe components. First the external accessory pipe is moved into a position intermediate between its lower end position and its upper end position wherein its upper end forms a sealing contact with the hollow plunger's upper front wall. At this time the upper cylinder chamber is hydraulically separated in such manner from the lower cylinder chamber that the liquid is precluded from passing from the upper into the lower chamber.

As the dispenser's displaceable element is further moved upward, an external accessory pipe protrusion cooperating with part of the hollow plunger forces this plunger from its lower into its upper end position. As a result, the volume of the upper cylinder chamber decreases and the liquid pressure increases. In turn the liquid flows through the feed pipe which remains in its open position. Simultaneously the apertures previously covered by the hollow plunger and connecting the cylinder to the supply container are now open and the volume of the lower cylinder chamber is enlarged. A partial vacuum is created in the lower chamber and causes liquid to be aspirated from the supply container into the lower chamber. At the same time liquid is aspirated into the cylinder and fed from the cylinder into the ambience.

As soon as the user no longer drives the dispenser and thereby lets the dispenser displaceable element move downward, first the internal feed pipe shall be moved into its closed position. As said movable dispenser element continues moving downward, it causes also the external accessory pipe to move from its upper end position into its lower one. While the external accessory pipe is moving back into its lower end position, its protrusion, which cooperates with the hollow plunger, also forces this plunger to move back into its lower end position. The aperture in the upper front wall of the hollow plunger being opened by the back motion of the external accessory pipe, and the hollow plunger, as soon as it has reached its lower end position, again sealing the cylinder apertures with respect to the supply container, the liquid in the lower cylinder chamber is able to spread evenly. Backflow into the supply container is precluded.

The above described procedure is optimized by selecting the frictional forces between the individual pump components in a manner that transmission of the motion of one component to the particular other component shall not be frictional. In this manner for instance the internal feed pipe may be moved from its closed into its open position without thereby constraining an accompanying motion of the external accessory pipe. Similar considerations also apply to the sliding connection between the external accessory pipe and the hollow plunger.

This problem is also solved by a liquid dispenser in particular of liquid soap, using a pump such as was described above.

Lastly said problem also may be solved by a method for withdrawing a liquid or a pasty substance, in particular liquid soap, using a pump as defined by the features of claim 23.

Figure 3:
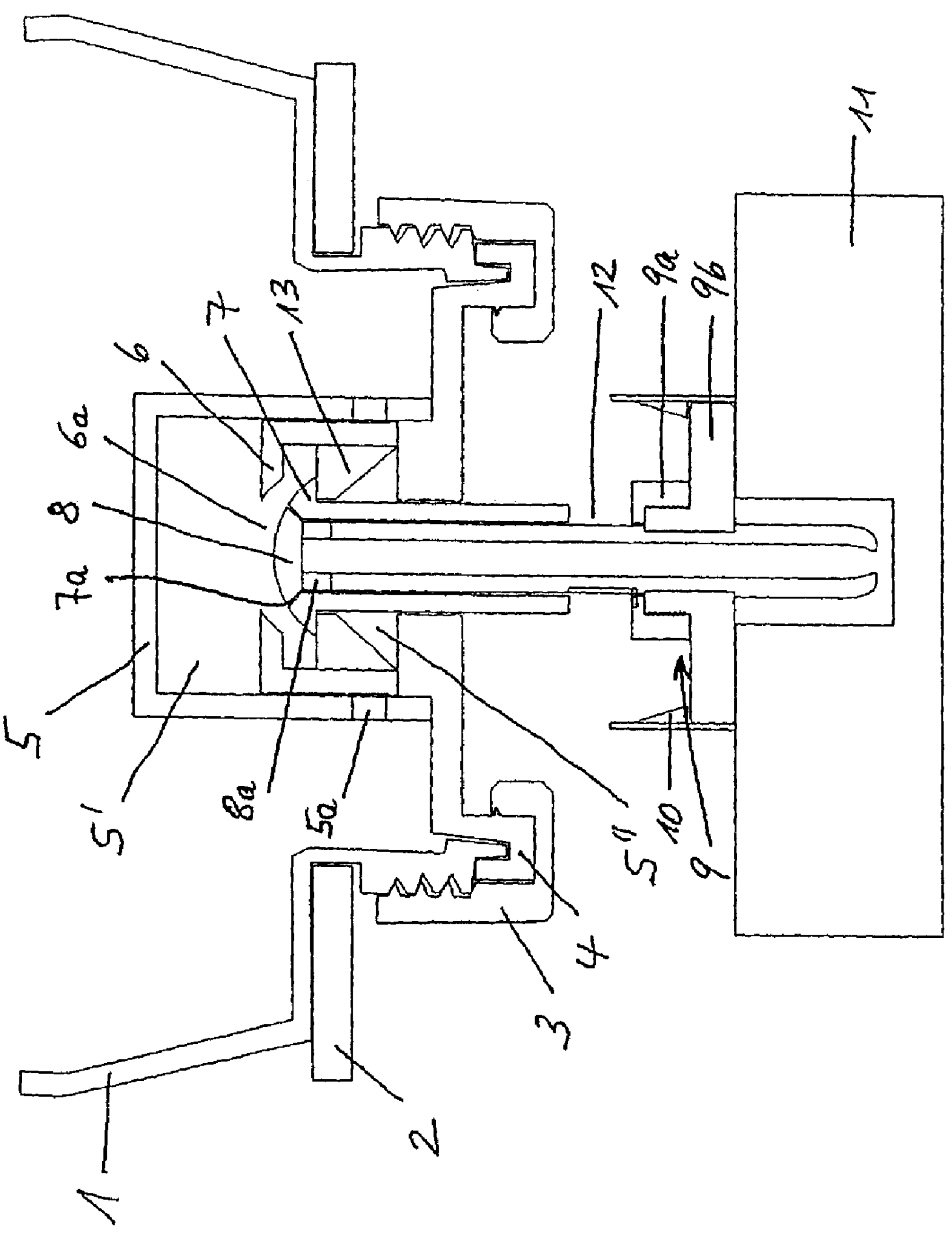

There are a number of ways to design the pump, the dispenser of the invention and to carry out said method and to implement further improvements. Reference is made in this sense for instance to the claims dependent on claim 1 and on the other hand to the description of an illustrative embodiment in relation to the appended drawings, where FIGS. 1*a*, 1*b* show a dispenser with a pump to remove liquid soap in a first embodiment mode of the invention, FIGS. 2*a*-2*f* are schematics of a pumping procedure using the dispenser of FIG. 1, FIG. 3 shows a liquid soap dispenser using a pump of a second embodiment mode of the invention, and FIGS. 4*a*, 4*b* show a dispenser of liquid soap using a pump and shown in a third and fourth embodiment mode of the invention.

The dispenser shown in FIG. 1*a* is fitted with a supply container 1 in the form of a contractible supply flask resting on a rigid seat 2 of said dispenser. A coupling nut 3 is screwed on the open end of the supply container 1 and clamps in sealing manner an insert 4 into the aperture of the supply container 1. The central part of the insert 4 constitutes the base of a cylinder 5 configured inside the supply container 1.

The cylinder 5 consists of a circumferential side wall, of an upper front wall and of said base and receives a hollow plunger 6 fitted with a circumferential side wall, an upper front wall and base. The cylinder 5 is sub-divided into an upper chamber 5' and a lower chamber 5". A central aperture 6*a* is situated in the upper front wall of the hollow plunger 6. The upper portion of an external accessory pipe 7—consisting of a circumferential pipe wall, of an upper open and a lower open end—again is configured within the hollow plunger 6. The upper end of the external accessory pipe 7 is fitted with an aperture 7*a*. Lastly the upper portion of an internal feed pipe 8 comprising a circumferential pipe wall, an upper, closed end and a lower, open end is configured within the external accessory pipe 7, several apertures 8*a* being present in the upper portion of the pipe wall of the internal feed pipe 8 transversely to the longitudinal direction and are covered in the present instance by the external accessory pipe 7. The cylinder also is fitted with apertures 5*a* in its sidewall, said apertures being configured near the base and being covered in the present instance by the side wall of the hollow plunger 6.

The lower portion of the feed pipe 8 projects out of the external accessory pipe 7 and is connected to a receiving disk 9 which in turn is connected by retaining clamps 10 to a displaceable dispenser element 11. In the shown embodiment mode, the receiving disk 9 is designed in a manner that a gap 12 remains between its upper end and the lower end of the external accessory pipe, said gap defining an internal excursion.

The lower end of the internal feed pipe 8 communicates freely with the ambience.

In this illustrative embodiment mode, the external accessory pipe 7 rests by means of a flange at its upper end against a stop 13 which is a fixed component of the hollow plunger 6. This configuration is shown schematically in the topview of FIG. 1*b*. This representation shows that the stop 13 comprises four brackets 14 supporting the flange of the external accessory pipe 7, said flange in turn supporting a protrusion, also flange-shaped, at the upper end of the internal feed pipe 8.

Operation of the above apparatus is discussed below in relation to FIGS. 2*a*-2*f*.

FIG. 2*a* shows the rest position wherein the apertures 5*a* are covered in sealing manner by the hollow plunger 6, whereby liquid is precluded from being exchanged between the omitted supply container 1 and the inside of the cylinder 5. At the same time the internal feed pipe 8 is in its closed position and therefore the apertures 8*a* acting as passages from the cylinder 5 to the feed pipe 8 are closed. Accordingly liquid delivery to the ambience is impossible.

FIG. 2*b* shows the state wherein the user now operates the dispenser's displaceable element 11. As soon as the user does so, the receiving disk 9 and therefore the feed pipe 8 connected to it shall be moved up until the upper end of the receiving disk 9 impacts the lower end of the external accessory pipe 7. As a result the internal feed pipe 8 has moved into its open position wherein the apertures 8*a* are clear and communication has been set up between the cylinder 5 and the ambience.

In FIG. 2*c*, the displaceable dispenser element 11 was moved farther upward, and, because of the receiving disk 9 transmitting the motion of the dispenser's displaceable element 11 to the external accessory pipe 7, the latter also was moved upward from its lower end position. The external accessory pipe 7 in this embodiment is situated in an intermediate position between a lower end position and an upper end position wherein its upper end closes in sealing manner against the upper front wall of the hollow plunger 6. At this time therefore the upper cylinder chamber 5' is hydraulically separated from the lower cylinder chamber 5" in a manner that no liquid can pass from the upper chamber into the lower one.

If now the displaceable dispenser element 11 is further moved upward as shown in FIG. 2*d*, then a flange at the external accessory pipe 7 cooperating with the upper front wall of the hollow plunger 6 will force this plunger from its lower into its upper end position. The volume of the upper chamber 5' of the cylinder 5 is reduced thereby and hence the liquid pressure is increased. As a result the liquid flows out, now as before, through the feed pipe 8 which is in its open position. At the same time, the apertures 5*a* no longer are covered by the hollow plunger 6, whereby liquid is aspirated from the supply container 1 into the enlarged volume of the lower cylinder chamber 5" due to the partial vacuum generated therein. Therefore liquid is aspirated into the cylinder 5 and simultaneously liquid is dispensed out of it into the ambience.

FIGS. 2*e*, 2*f* and 2*a* show the sequence taking place as soon as the user releases the dispenser.

As shown in FIG. 2*e*, first the displaceable dispenser element 11 moves downward illustratively on account of an omitted restoring spring acting directly or indirectly on said displaceable element. The internal feed pipe 8 being connected by means of the receiving disk 9 and the clamps 10 to the displaceable element 11, also is displaced downward. At this time the upper chamber 5' and the lower chamber 5" of the cylinder 5 are still hydraulically separated from each other.

FIG. **2*f* shows that as the dispenser displaceable element 11 is moved farther down and hence also the internal feed pipe 8, the external accessory pipe 7 also is caused to move from its upper end position into its lower one, FIGS. 2*f* and 2*a* showing the lower end position. This feature is implemented by the end of the feed pipe 8 comprising a flange cooperating with a stop, a bevel, at the external, accessory pipe's upper end. The protrusion at the external, accessory pipe 7, which, as already shown in FIGS. 2*c* and 2*d*, caused the hollow plunger 6 to move upward, now, as shown in FIGS. 2*f* and 2*a*, constrains the hollow plunger 6 back into its lower end position. This feature is implemented by the hollow plunger 6 being fitted with a stop 13 cooperating with the protrusion of the external, accessory pipe 7 and transmitting the motion of the other external accessory pipe to the remaining hollow plunger 6. The return of the external, accessory pipe 7 entailing aperture the aperture 6*a* in the upper front wall of the hollow plunger 7, and said plunger again sealing off the apertures 5*a* in the cylinder 5 to the supply container 1 as soon as it reaches its lower position, the liquid contained in the lower cylinder chamber 5" is able to spread evenly throughout the entire cylinder 5. Backflow into the supply conduit 1** is precluded.

Lastly FIG. 3 shows a dispenser and a pump of the above design except that the receiving disk 9 is sub-divided into an upper portion **9*a* and a lower portion 9*b*. The upper portion 9*a* constitutes an element by means of which the gap 12 between the upper end of the receiving disk 9 and the lower end of the external accessory pipe 7 is adjustable when the internal feed pipe 8** is in its closed position, that is, in the case of said gap being a maximum.

The upper portion **9*a* is connected in threaded manner to the lower portion 9*b* whereby said upper portion can be rotated relative to said lower portion. When the portion 9*a* is rotated upward relative to the portion 9*b*, the gap 12 will decrease. This feature offers the advantage that the internal excursion and hence the delivered quantity of liquid soap is adjustable. The less the adjusted maximum gap 12 between the upper end of the receiving disk 9 and the lower end of the external accessory pipe 7, the farther the external accessory pipe 7 will move up the hollow plunger 6 and the more liquid will be expelled from the upper cylinder chamber 5' through the feed pipe 8**.

Figure 4:
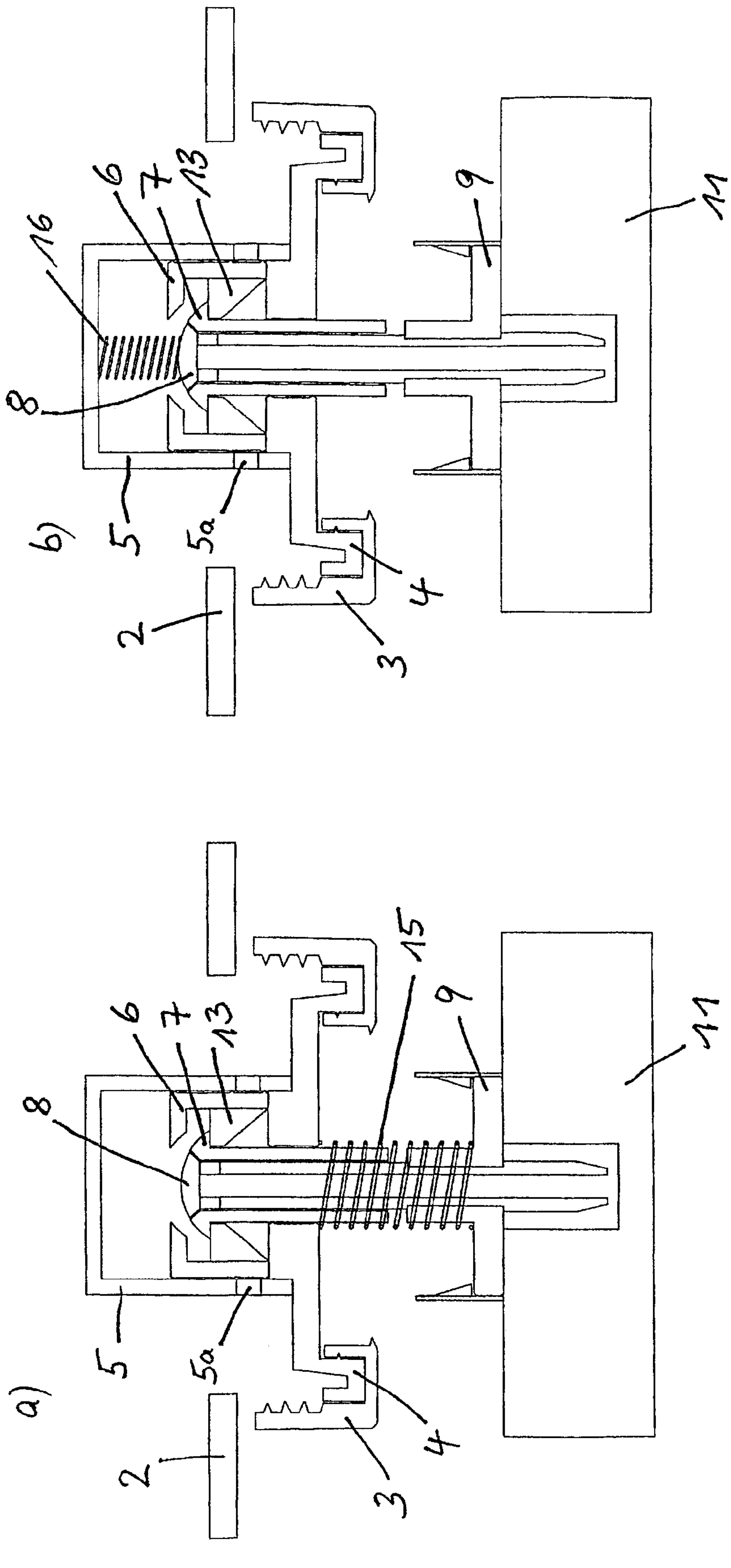

Lastly FIG. 4 shows two further embodiment modes of a pump of the invention, with the feature of a restoring spring 15 and 16 being integrated into a pump. The remaining design of pump and dispenser was discussed in relation to FIGS. 1 through 3.

The embodiment mode of FIG. **4*a* comprises a restoring spring 15 configured around the external accessory pipe 7 and resting at one end against the outside of the insert 4 and at the other end against the receiving disk 9. The receiving disk 9 is rigidly joined to the internal feed pipe 8 and moreover is displaceable relative to the insert 4 which in turn is rigidly joined to the cylinder 5, so that in this embodiment mode the restoring spring 15 will act indirectly on the internal feed pipe 8. From the state shown in FIG. 2*d* until the state shown in FIG. 2*a*, automatic displacement is made possible by the restoring spring 15. During this sequence, the apertures 5*a* in the sidewall of the cylinder 5 will be closed after one pumping action, namely the pump's restoring spring 15 shall indirectly act on the feed pipe 8 and constrain the apertures 5*a* to be covered by the sidewall of the hollow plunger 6 cooperating by means of the external, accessory pipe 7 with the internal feed pipe 8**.

The above design also is the principle of the embodiment mode shown in FIG. **4*b*, which comprises a restoring spring 16 resting at one end against the inside the cylinder 5 and at its other end against the internal feed pipe 8. In this instance the restoring spring 16 acts directly on the inside feed pipe 8 and also makes possible automated motion from the state shown in FIG. 2*d* to that in FIG. 2*a***.

What is claimed is:

1. A pump for withdrawing a liquid or a pasty substance from a contractible supply container (1), said pump comprising a cylinder (5), a hollow plunger (6) configured within the cylinder (5), an external accessory pipe (7) configured at least partly within the hollow plunger (6) and an internal feed pipe (8) configured at least partly inside the external accessory pipe (6), said internal feed pipe (8) being displaceable relative to the external accessory pipe (7) with which it cooperates such that a displacement of internal feed pipe (8) constrains a displacement of the external accessory pipe (7), the external accessory pipe (7) being displaceable relative to the hollow plunger (6) and cooperating with the hollow plunger such that a displacement of the of the external accessory pipe (7) constrains a displacement of the hollow plunger (6), the hollow plunger (6) being displaceable relative to the cylinder (5) that is fitted with at least one aperture (**5*a*) through which communication may be established between a space of the supply container (1) and the space inside the cylinder (5) and which can be opened and closed by the hollow plunger (6), said hollow plunger (6) being fitted with an aperture (6*a*) which can be opened and closed jointly by the internal feed pipe (8) and the external accessory pipe (7), said external accessory pipe (7) being fitted with an aperture (7*a*) that can be opened and closed by the internal feed pipe (8), at least one aperture (8*a*) being present in the internal feed pipe (8) and being opened and closed by the external accessory pipe (7) such that the liquid or pasty substance can be released through the internal feed pipe (8) into the ambience and simultaneously can be aspirated from the supply container (1) into the cylinder (5**).

2. The pump as claimed in claim 1, wherein the cylinder (5) is fitted with a circumferential side wall, an upper front wall and a base.

3. The pump as claimed in claim 2, wherein the hollow plunger (6) configured within the cylinder (5) is fitted with a circumferential side wall, an upper front wall and a base.

4. The pump as claimed in claim 3, wherein the external accessory pipe (7) configured at least partly inside the hollow plunger (6) comprises a circumferential pipe wall, an upper, open end and a lower open end.

5. The pump as claimed in claim 4, wherein the internal feed pipe (8) configured at least partly within the external accessory pipe (7) comprises a circumferential pipe wall, an upper closed end and a lower open end, the aperture (**8*a***) being configured in the upper portion of the pipe wall transversely to the longitudinal direction.

6. The pump as claimed in claim 5, wherein the internal feed pipe (8) is displaceably supported in the external accessory pipe (7) and wherein the pipe wall of the internal feed pipe (8) is connected in sealing and sliding manner with the pipe wall of the external accessory pipe (7), the internal feed pipe (8) being displaceable, relative to the external accessory pipe (7), between a closed position, wherein the aperture (**8*a*) in the pipe wall of the internal feed pipe (8) is covered in sealing manner by the upper end of the pipe wall of the external accessory pipe (7), and an open position, wherein the aperture (8***a*) in the pipe wall of the internal pipe feed (8) is free, the diameter of the upper end of the internal feed pipe (8) being less than the diameter of the aperture (6*a*) in the upper front wall of the hollow plunger (6), the internal feed pipe (8) being fitted with a protrusion that cooperates with a portion of the external accessory pipe (7).

7. The pump as claimed in claim 5, further comprising a receiving disk (9) connected to a displaceable dispenser element (11) and to the internal feed pipe (8) and configured so far underneath the lower end of the external accessory pipe (7) as to subtend a gap (12) between an upper end of the receiving disk (9) and the lower end of the external, accessory pipe (7) when the internal feed pipe (8) is in the closed position, the upper end of the receiving disk (9) and the lower end of the external accessory pipe (7) touching each other when the internal feed pipe (8) is in its open position.

8. The pump as claimed in claim 7, wherein the receiving disk (9) is fitted with a device adjusting the gap (12) between the upper end of said receiving disk and the lower end of the external accessory pipe (7) when the feed pipe (8) is in its closed position.

9. The pump as claimed in claim 8, wherein said device constitutes an upper part (9*a*) of the receiving disk (9) and is displaceably connected to a lower part (9*b*) of said disk or to the internal feed pipe (8) such that the gap (12) between the lower part (9*b*) of the receiving disk (9) and the upper part (9*a*) of said disk is variable.

10. The pump as claimed in claim 9, wherein the upper part (9*a*) of the receiving disk (9) is connected by a thread to the lower part (9*b*) of said disk or to the internal feed pipe (8) such that rotating the upper part (9*a*) relative to the lower part (9*b*) of the receiving disk (9) or relative to the feed pipe (8) constrains a change in a gap (12) between the lower part (9*b*) and the upper part (9*a*) of said disk.

11. The pump as claimed in claim 4, wherein the external accessory pipe (7) is displaceably supported in the cylinder base and the pipe wall of the external accessory pipe (7) is connected in sealing and sliding manner to an aperture in the base of the cylinder (5), the external accessory pipe (7) being displaceable between a lower end position wherein the upper end of the external accessory pipe (7) is configured at a gap from the upper front wall of the hollow plunger (6), and a lower end position wherein the upper end of the external, accessory pipe (7) is sealed off by the upper front wall of the hollow plunger (6), an intermediate position between the lower end position and the upper end position being defined by the upper end of the external accessory pipe (7) being sealed off by the upper front wall of the hollow plunger when latter is in the lower end position and at a gap from the upper front wall of the hollow plunger when latter is in the upper end position, the external accessory pipe (7) being fitted with a protrusion cooperating with a portion of the hollow plunger (6).

12. The pump as claimed in claim 11, wherein the protrusion at the external accessory pipe (7) and/or at the internal feed pipe (8) is at least an arcuate collar or a flange.

13. The pump as claimed in claim 11, wherein the portion of the hollow plunger (6) cooperating with the protrusion is a stop (13) that is connected to the side wall of the hollow plunger (6).

14. The pump as claimed in claim 13, wherein the stop (13) comprises strips/braces (14) or an annulus fitted with passages that connect the region above the stop (13) to the region below it.

15. The pump as claimed in claim 8, wherein the portion of the hollow plunger (6) cooperating with said protrusion is constituted by the upper front wall or the base.

16. The pump as claimed in claim 3, wherein the cylinder (5) is sub-divided into an upper chamber (5') and a lower chamber (5"), the upper chamber (5') being defined as the space between the upper front wall of the cylinder (5) and the upper front wall of the hollow plunger (6), and the lower chamber (5") being defined as the space between the upper front wall of the hollow plunger (6) and the base of the cylinder (5), the cylinder (5) being fitted with an aperture in the base crossed by the external accessory pipe (7) between the ambience and the inside of the cylinder (5) and with one or more apertures (5*a*) situated in a zone that can be covered internally by the hollow plunger (6).

17. The pump as claimed in claim 16, wherein the apertures (5*a*) in the cylinder (5) are configured in that region in the side wall of said cylinder and near the base that can be internally covered by the hollow plunger (6).

18. The pump as claimed in claim 3, wherein the hollow plunger (6) is displaceably supported in the cylinder (5) and wherein the side wall of the hollow plunger (6) adjoins in sealing, sliding manner the sidewall of the cylinder (5), the hollow plunger (6) being displaceable between a lower end position wherein the apertures (5*a*) are covered in sealing manner in the zone which internally can be covered by the hollow plunger (6) and an upper end position wherein the apertures (5*a*) in the cylinder (5) are open in the region which can be internally covered by the hollow plunger (6), said hollow plunger comprising at least one aperture in the base and one aperture (6*a*) in the upper front wall.

19. The pump as claimed in claim 18, wherein, when in its lower end position, the hollow plunger (6) touches the base of the cylinder (5).

20. The pump as claimed in claim 18, wherein a diameter of the aperture in the base of the hollow plunger (6) is equal to an inside diameter of the hollow plunger (6).

21. The pump as claimed in claim 2, wherein the base of the cylinder (5) is a component of an insert (4) able to seal off the supply container (1) from the ambience.

22. The pump as claimed in claim 1, further comprising at least one restoring spring (15, 16) acting directly or indirectly on the internal feed pipe (8).

* * * * *